Oct. 8, 1963

J. CRAGGS ETAL 3,106,284

FLEXIBLE SIDEFRAME CONVEYOR FOR SPANNING LONG UNSUPPORTED DISTANCES

Filed Aug. 28, 1959

INVENTORS.
Joseph Craggs
Keith McCann
BY Parker & Carter
Attorneys.

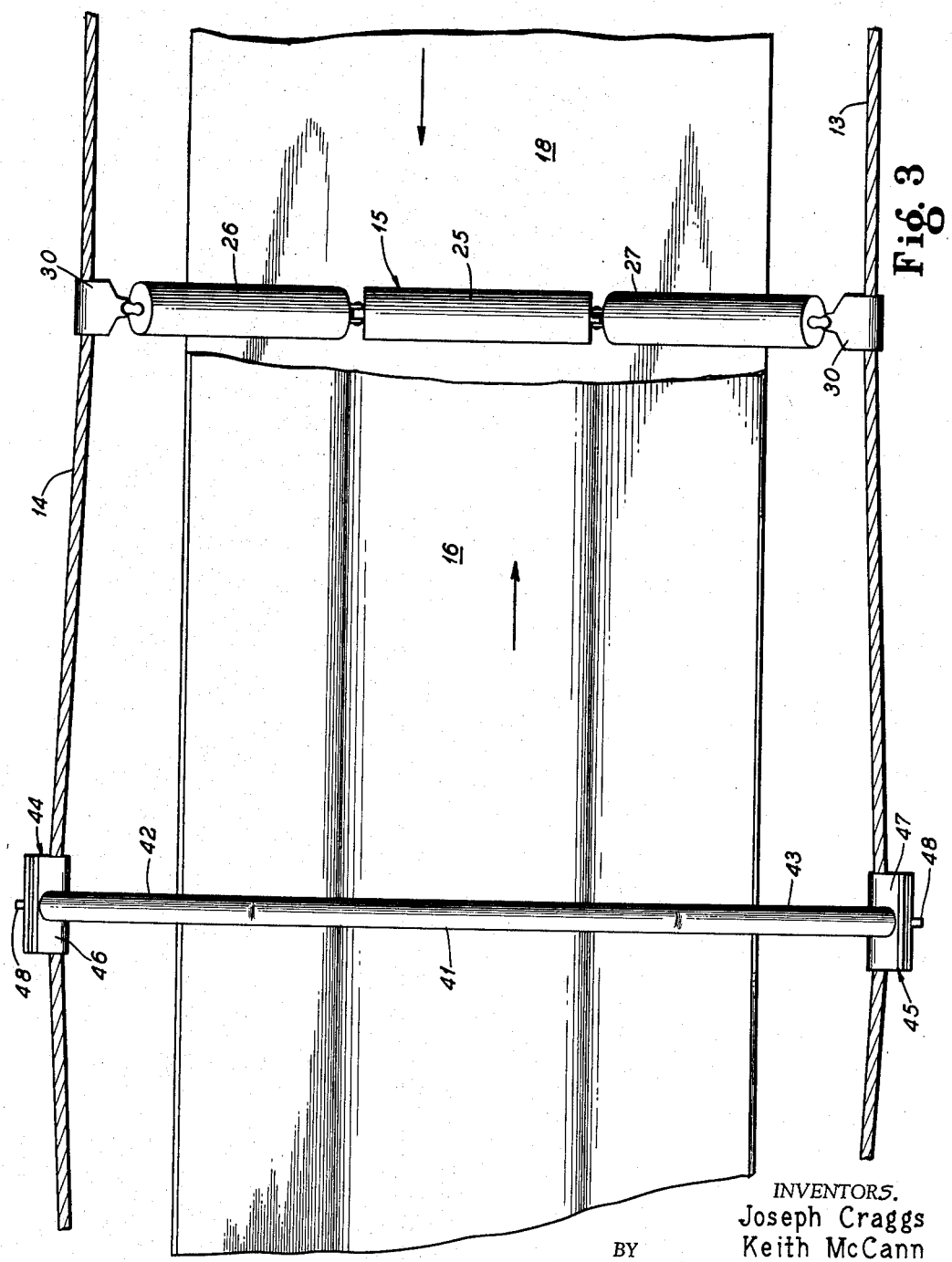

United States Patent Office 3,106,284
Patented Oct. 8, 1963

3,106,284
FLEXIBLE SIDEFRAME CONVEYOR FOR SPANNING LONG UNSUPPORTED DISTANCES
Joseph Craggs and Keith McCann, Taylorville, Ill., assignors to Goodman Manufacturing Company, Chicago, Ill., a corporation of Illinois
Filed Aug. 28, 1959, Ser. No. 836,671
1 Claim. (Cl. 198—192)

This invention relates in general to flexible strand conveyors, and particularly to means for maintaining the belt in place on a conveyor which is suspended above the ground and exposed to the action of the wind.

Flexible strand conveyors of the type illustrated in Craggs et al. Patent No. 2,773,257 are coming into widespread use due to their many inherent and desirable features. These conveyors generally comprise a pair of flexible strands or wire ropes trained along a conveying course and a plurality of troughing idler assemblies suspended from and extending between the ropes. The idler assemblies generally include a series of interconnected rollers which may be free to flex in a vertical plane with respect to one another or partially or completely restrained from flexing by a rigid or semirigid cradle assembly. The idler assemblies form a bed for the conveying or carrying reach of a flexible conveyor belt.

The wire ropes in turn are suspended from intermediate support structures. In the case of floor-supported conveyor systems, a plurality of support stands are spaced at predetermined intervals along the conveying course and the ropes are carried by the stands. In other installations the strands or rope sideframes may be suspended from an elevated support, such as the roof of a mine, by hangers. In any event the intermediate supporting structures are spaced close enough together to prevent undue sag of the loaded conveyor between adjacent supports.

The return reach of the conveyor belt generally passes directly beneath the conveying reach and is supported by a plurality of return roller assemblies which in turn may be connected directly to the intermediate supporting structures or suspended from the rope sideframes.

There will always be some inward and downward deflection of the rope sideframes in any flexible strand conveyor system due to the inherent resiliency of the rope sideframes. It is highly desirable to reduce this inward and downward deflection as much as possible so as to maintain the troughing idler assemblies at a substantially constant level. This level positioning of the idler assemblies insures better belt training, particularly when the conveyor runs unloaded. To maintain this equidistant spacing or to maintain the gauge of the rope sideframes substantially constant, substantially rigid spreader bars extending between and connected directly to the flexible strands may be utilized. These bars pass beneath the conveying reach of the belt and are dished to a depth sufficient to avoid interference with the belt when it is fully loaded.

Flexible strand conveyors are particularly adapted for installations in which material must be conveyed across a long unsupported distance such as a gully, ravine, river or thoroughfare. The rope sideframes are anchored securely to a support point on either side of the unsupported distance and the spreader bars maintain the strands equidistantly spaced throughout the unsupported distance. This type of installation works very well in situations in which the conveyor is not exposed to the elements, but when the conveyor must span an extended unsupported distance in which it is exposed to high winds, it is difficult to maintain the belt on the conveyor, especially when running in an unloaded condition. As the conveyor sways due to its wind resistance, the wind tends to catch the belt and flop it over and off the idler assemblies.

Accordingly, a primary object of this invention is to provide a flexible strand conveyor system capable of spanning long unsupported distances in which the system is exposed to the elements.

Another object is to provide a flexible strand conveyor system capable of spanning long unsupported distances in which the conveyor belt is exposed to high winds which requires no special parts or costly installation techniques.

Other objects of the invention will become apparent throughout the course of the specification and claims.

The invention is illustrated more or less diagrammatically in the accompanying drawings wherein:

FIGURE 3 is a top plan view of a portion of the conveyor system of FIGURE 1 taken substantially on the line 3—3 of FIGURE 1.

Like reference numerals will be used to refer to like parts throughout the specification and drawings.

Figure 1:
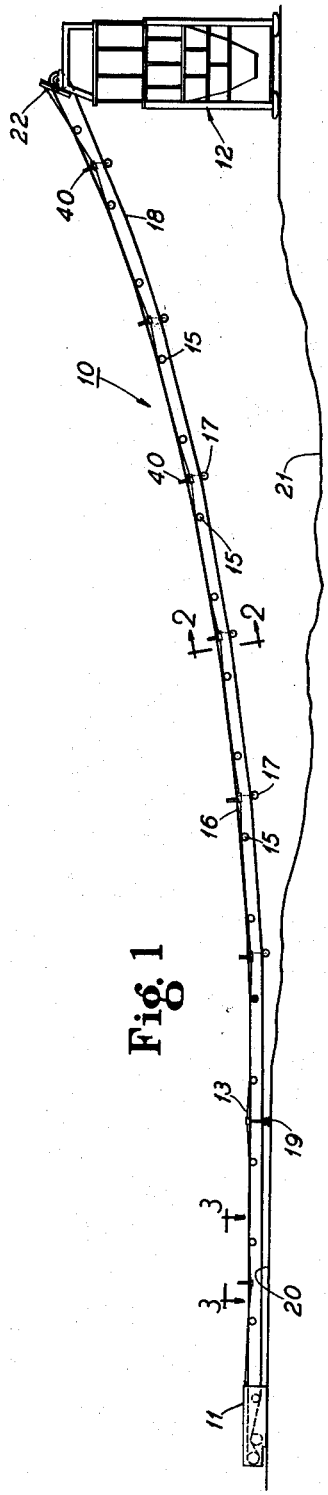
FIGURE 1 is an elevation of a flexible strand conveyor system which spans a long unsupported distance.

A flexible strand conveyor 10 is shown in FIGURE 1 as extending between a tail section installation 11 and a hopper 12. The conveyor includes a pair of flexible strands 13 and 14 from which a plurality of troughing idler assemblies 15 are suspended. The troughing idler assemblies form a bed for the conveying reach 16 of a flexible conveyor belt. Return roller assemblies 17 are suspended at spaced intervals from the flexible strands and support the return reach 18 of the conveyor belt. In this instance a supporting stand 19 resting on the ground 20 serves as an intermediate support structure upon which the flexible strands are hung on one side of a gully or ravine 21. The other end of the unsupported span of the conveyor is suspended as at 22 from the hopper into which the conveyor discharges.

Figure 2:
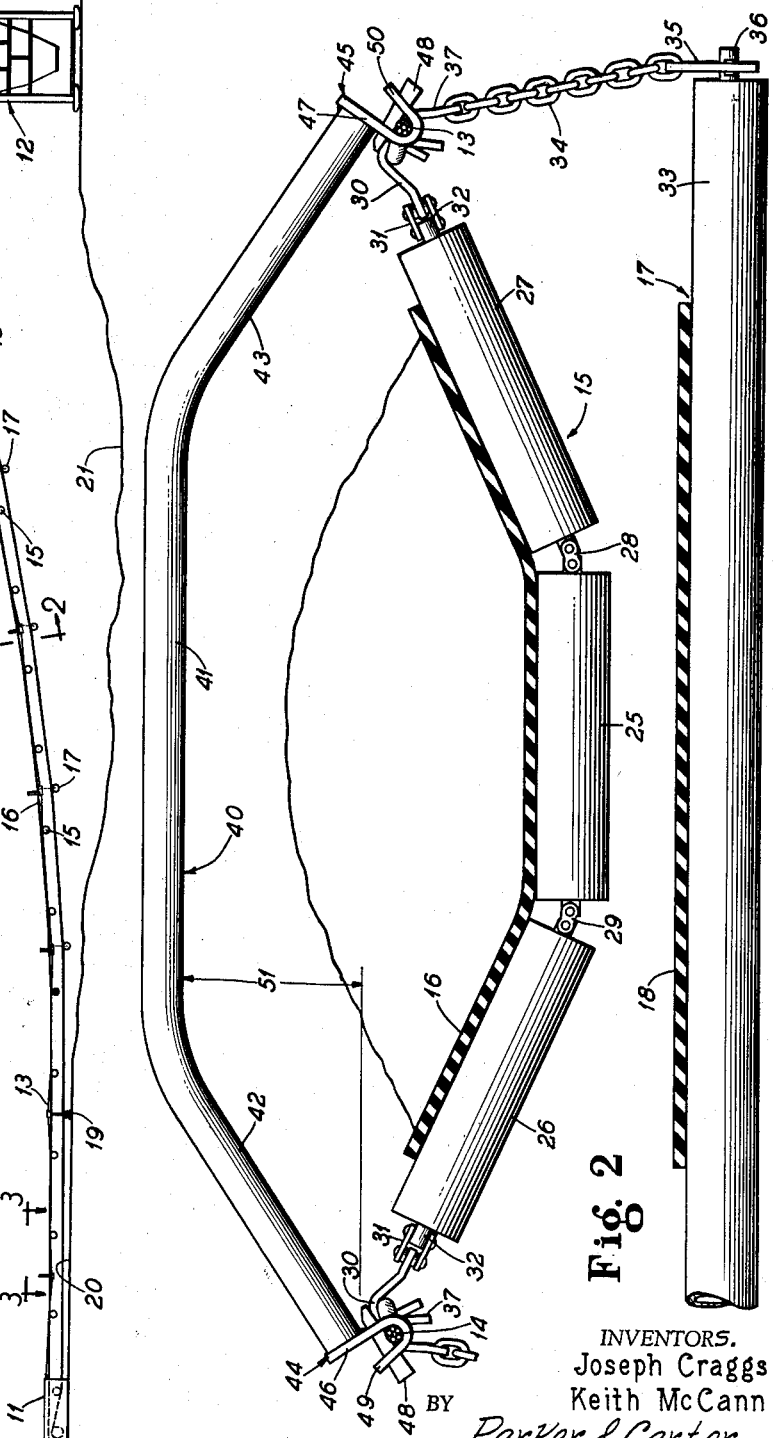
FIGURE 2 is a section taken substantially on the line 2—2 of FIGURE 1.

In FIGURE 2 the troughing idler assembly is shown as comprising a plurality of idler rollers. In this instance the assembly includes a center primary load-carrying roller 25 flanked by a pair of side or wing rollers 26 and 27. The inner ends of the wing rollers are joined to the ends of the center roller by any suitable means, such as links 28 and 29, which permit relative flexure of the wing rollers with respect to one another and to the center roller in a vertical plane, but confine flexure of the rollers in a plane parallel to the plane of the belt. The assembly is suspended from the flexible strands 13 and 14 by connecting means or hooks 30 which are connected by horizontally disposed links 31 to the projecting outer ends of the wing roller shafts 32.

The return roller assembly 17 includes a return roller 33, which in this instance is suspended from the flexible strands by short lengths of chain 34. Chains 34 are anchored at their lower ends in plates 35, which receive the ends of shaft 36, and at their upper ends to connecting members or hooks 37 which engage the flexible strands. Any suitable means, not shown, may be used to force the flexible strands into snug engagement in hooks 30 and 37. The particular return roller construction illustrated has excellent belt training characteristics which are fully described in copending application, Serial No. 772,106, filed November 5, 1958, by Charles J. Arndt, Roy F. Lo Presti and Charles T. Ogden.

In order to maintain the flexible strands a substantially uniform distance apart throughout the length of the long unsupported span between support stand 19 and hopper 12, a plurality of spreader members 40 are secured to the strands at selected intervals. In this instance the spreader members comprise a substantially rigid tubular spreader bar having an elongated substantially linear center portion 41 terminating in downwardly turned side portions 42 and 43. The ends of the side portions are welded or otherwise suitably secured to connecting members 44 and 45. In this instance the connecting members are U-shaped saddle plates which form seats for receiving the flexible strands 13 and 14. A spreader bar is welded to the long legs 46, 47 of the saddles, and wedges 48 pass through apertures in the short legs 49, 50 aligned with apertures in the long legs to force the strand into snug engagement in the seat. The depth 51 of the spreader bar is sufficient to clear the troughing idler assembly and a load carried thereon.

The use and operation of the invention are as follows:

Maintaining the belt, particularly in an unloaded condition, upon the roller assemblies in a flexible strand conveyor which spans a long unsupported distance exposed to high winds presents serious problems. The natural sway of the unsupported span of the conveyor tilts both the return reach and the conveying reach of the conveyor belt into the wind. As a result, the wind catches the belt and throws it completely off the conveyor. This condition in the conveying reach is aggravated by the natural troughed configuration of the belt due to the inward deflection of the strands under the influence of the weight of the troughing idler assemblies.

To overcome this problem the spreader members, which in this instance are tubular, substantially rigid spreader bars 41, are arched over the conveying reach of the belt to form with the troughing idler assemblies and the flexible strands a confining framework for the belt. When gusts of wind raise the belt off the troughing rollers the spreader bars prevent complete displacement of the belt from the assembly. When the gust subsides, the natural weight of the belt causes it to flop back onto the idler assemblies. The belt may become substantially misaligned from a centered position, but it never leaves the troughing idler assemblies. When a load is put on the belt the training effect between the belt and roller assemblies will quickly reposition the belt.

The spreader members also perform a useful function when the conveyor is loaded. If the conveyed material is very light it is possible for the belt to be completely overturned in a heavy wind and dump the contents. Should this occur in an installation of the type illustrated, the spreader bar will generally engage the upper surface of the load before it has been completely dumped from the belt and urge the belt and load back onto the bed formed by the troughing roller assemblies.

The return roller assemblies in conjunction with the troughing idler assemblies and the flexible strands also form a confining framework for the return reach of the belt and prevent it from being blown completely off the assemblies.

Although a preferred embodiment of the invention has been illustrated and described, it will be apparent that other variations and modifications are possible. For example, the spreader members need not always take the form of a tubular bar having the configuration shown in FIGURE 2. It may be possible in some instances to connect the spreader bars directly to the ends of the troughing idler assemblies and suspend this composite structure from flexible strands which are not located at the ends of the troughing roller assemblies. For example, one or a plurality of strands may be strung between the ground 20 and top of the hopper 12 in a position overlying the belt. Accordingly, the scope of the invention should only be restricted by the scope of the appended claim.

We claim:

A flexible sideframe conveyor for bridging long spans, said flexible sideframe conveyor including, in combination,
 a pair of generally parallel flexible sideframes spanning a distance of substantial length, said flexible sideframes being unsupported throughout the span,
 a plurality of troughing idler assemblies suspended between the flexible sideframes, said troughing idler assemblies forming a bed for the conveying reach of a flexible conveyor belt, said troughing idler assemblies being located at intervals along the unsupported span,
 return roller means for supporting the return reach of the flexible conveyor belt,
 an orbitally movable endless flexible conveyor belt having its conveying reach supported by the troughing idler assemblies, and its return reach by the return roller means, and
 a plurality of spreader members for maintaining the gauge of the flexible sideframes substantially uniform throughout the unsupported span and for preventing displacement of the conveying reach of the conveyor belt due to wind, vibration, or other causes, when unloaded,
 at least a portion of said spreader members comprising a substantially rigid, elongated structural member having its end portions secured to the flexible sideframes and being arched over the conveying reach of the belt to thereby form, with the flexible sideframes and troughing idler assemblies, a confining framework for the conveying reach,
 each spreader member having a generally arcuate shape,
 the vertical distance between the deepest point in the troughing idler assembly to the highest point of the arcuate spreader being substantially less than the width of the conveyor belt whereby inversion of the belt is positively restrained by impingement against the arcuate spreader,
 each of said spreader members being spaced from, and secured to the flexible sideframes independently of adjacent spreader members to thereby provide unobstructed access to the conveyor belt between spreader members.

References Cited in the file of this patent

UNITED STATES PATENTS

| | | |
|---|---|---|
| 2,885,066 | Lo Presti | May 5, 1959 |
| 2,904,166 | Stinson | Sept. 15, 1959 |
| 2,907,448 | Gleeson | Oct. 6, 1959 |
| 2,955,702 | Long et al. | Oct. 11, 1960 |

FOREIGN PATENTS

| | | |
|---|---|---|
| 738,598 | Germany | Sept. 3, 1943 |